United States Patent [19]

Weihsmann

[11] Patent Number: 4,597,555

[45] Date of Patent: Jul. 1, 1986

[54] ELECTRIC MOTOR MOUNT

[75] Inventor: Peter R. Weihsmann, Sherwood, Ark.

[73] Assignee: Franklin Electric Co., Inc., Bluffton, Ind.

[21] Appl. No.: 528,946

[22] Filed: Sep. 2, 1983

[51] Int. Cl.⁴ ............................................. F16M 1/022
[52] U.S. Cl. .................................... 248/672; 248/604; 248/638; 248/675; 29/432; 29/449
[58] Field of Search ............... 248/604, 603, 672, 670, 248/675, 638; 29/449, 448, 446, 432

[56] References Cited

U.S. PATENT DOCUMENTS

| | | | |
|---|---|---|---|
| 3,928,905 | 12/1975 | Atwater | 29/446 |
| 3,981,064 | 9/1976 | Hafner | 29/432 |
| 4,161,812 | 7/1979 | Litch, III | 248/638 X |
| 4,373,696 | 2/1983 | Dochterman | 248/604 |

Primary Examiner—Ramon S. Britts
Assistant Examiner—Karen Chotkowski
Attorney, Agent, or Firm—Marshall, O'Toole, Gerstein, Murray & Bicknell

[57] ABSTRACT

This disclosure relates to a mount for an electric motor, and comprises a sheet metal annular member adapted to support electric motor parts within it, a plurality of flexible sheet metal mounting lug members extending generally radially outwardly from the outer periphery of the annular member, each of said lug members including a flexible part and a mounting part that extends generally parallel to the adjacent part of said annular member, and a mechanical connection between each of the mounting parts and the annular member. Each mounting part and the adjacent part of the annular member form overlying sheets, and each mechanical connection is formed by portions of the sheets which are pierced and offset radially outwardly and form radially inner and outer bridges, the inner bridge being spread over the surface of the mounting part to interlock the parts together.

Another aspect of this disclosure relates to a method of fastening flexible mounting lugs to a motor utilizing mechanical connections.

4 Claims, 7 Drawing Figures

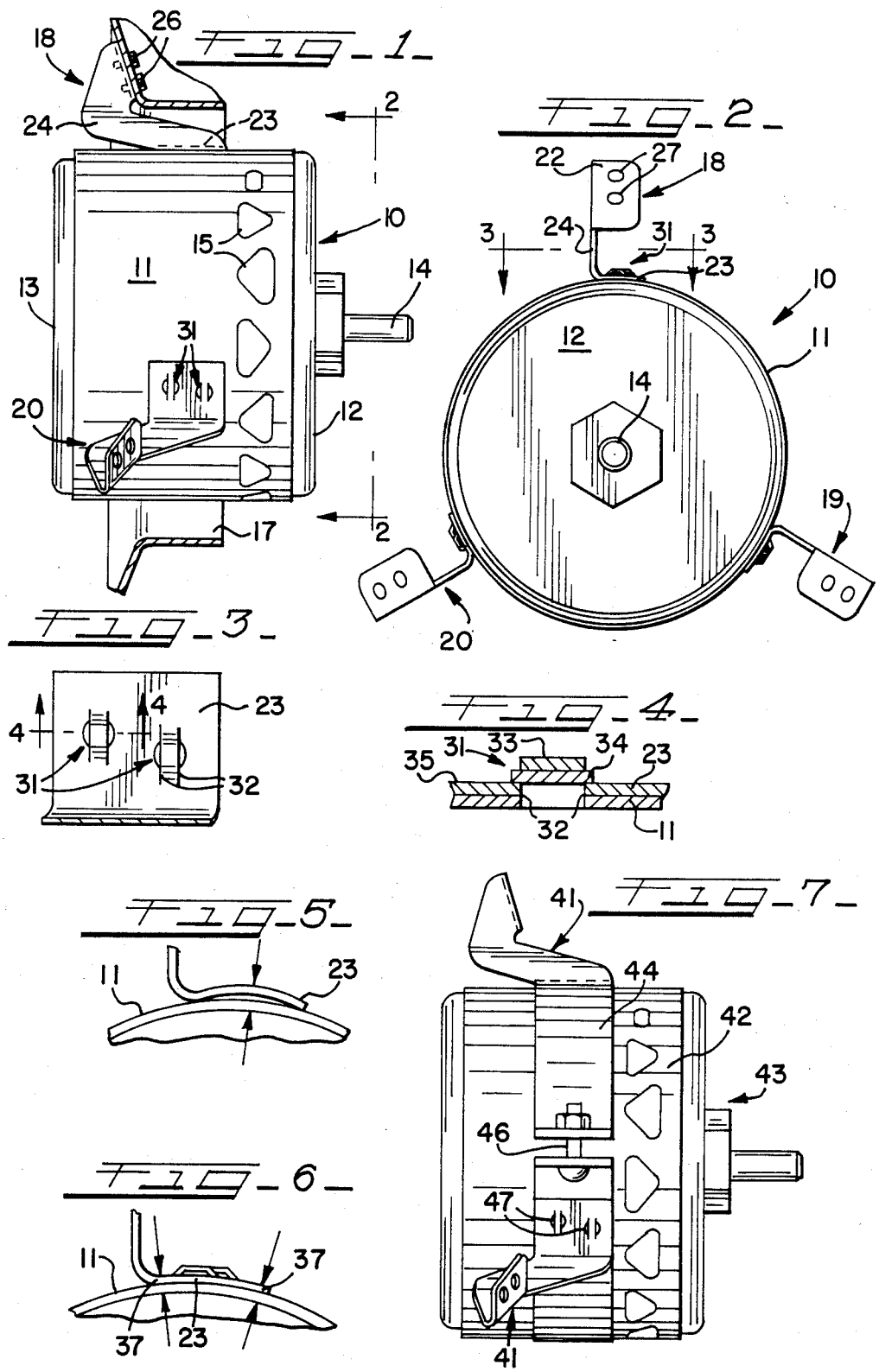

ELECTRIC MOTOR MOUNT

This invention relates to method and apparatus for flexibly mounting an electric motor of a direct drive blower in a housing.

BACKGROUND OF THE INVENTION

Many arrangements have been provided in the past for mounting an electric motor in a housing, such as the housing or frame of a fan, air conditioner or furnace. Usually the shell of the motor is connected directly to the housing by mounting lugs or arms which support both the motor and the blower wheel or blades. In some instances a relatively rigid mount is provided, and U.S. Pat. Nos. 1,781,155, 2,936,949 and 3,775,029 show constructions representative of this type.

In another type of mount, relatively flexible mounting lugs connect the motor to the housing, and the following U.S. patents show representative constructions:

| | | |
|---|---|---|
| 1,873,343 | 1,935,179 | 1,971,327 |
| 2,081,030 | 2,096,621 | 2,451,970 |
| 2,615,620 | 3,143,284 | 3,145,910 |
| 3,317,124 | 3,506,226 | 3,773,285 |
| 3,803,690 | 4,063,060 | 4,076,197 |
| 4,293,114 | 4,323,217 | |

The function of the flexible lugs is to provide torsional isolation of the motor from the housing in order to prevent vibrations and/or pulsations of the motor from being passed to the housing. In some instances the flexible lugs are attached directly to the motor shell and in other instances the lugs are attached to a circular strap or belly band which in turn is attached to the shell.

It is preferred that the flexible lugs be made of spring metal in order to obtain sufficient fatigue strength as well as torsional isolation, but problems have been encountered in the connection between spring metal lugs and the motor. In some constructions, such as those shown in U.S. Pat. Nos. 4,063,060 and 4,076,197, the lugs have been fastened by weld connections; great care must be taken to prevent the heat of welding from removing the temper from the lug metal, and expedients to prevent this have been relatively expensive and have proven to be unreliable over a long period of time.

Other constructions including spring metal lugs have employed mechanical connections between the lugs and the motor, such as shown in U.S. Pat. Nos. 4,293,114 and 4,323,217, but again these have been relatively expensive to manufacture. Further, in the structure shown in U.S. Pat. No. 4,293,114, the motor cannot be grounded through the mounting lugs, and in U.S. Pat. No. 4,323,217 a truly rigid connection is not obtained. U.S. Pat. No. 2,451,970 shows a mount wherein mechanical connections are made to the outer periphery of a motor, but such an arrangement would be expensive to manufacture and could not be used where the motor shell consists of a thin tubular metal part that fits tightly against the stator laminations, because the mechanical fasteners extend into the interior of the motor.

It is a general object of the present invention to provide an improved motor mount which avoids the foregoing problems and provides secure and relatively inexpensive connections.

SUMMARY OF THE INVENTION

Apparatus in accordance with this invention comprises a sheet metal annular member adapted to support electric motor parts within it, a plurality of flexible sheet metal mounting lug members extending generally radially outwardly from the outer periphery of said annular member, each of said lug members including a flexible part and a mounting part that extends generally parallel to the adjacent part of said annular member, and a mechanical connection between each of said mounting parts and said annular member. Each mounting part and the adjacent part of said annular member forming overlying sheets, and each mechanical connection is formed by portions of said sheets pierced and offset radially outwardly and forming radially inner and outer bridges, said inner bridge being spread over the surface of said mounting part to interlock said parts together.

Another aspect of this invention comprises a method of fastening flexible mounting lugs to a motor utilizing mechanical connections.

BRIEF DESCRIPTION OF THE DRAWINGS

The foregoing and other objects and advantages of the present invention will become more apparent from the following description taken in conjunction with the accompanying figures of the drawing wherein:

FIG. 1 is a view of an electric motor assembly embodying the present invention;

FIG. 2 is a view taken on the line 2—2 of FIG. 1;

FIG. 3 is an enlarged fragmentary view taken on the line 3—3 of FIG. 2;

FIG. 4 is a still further enlarged fragmentary sectional view taken on the line 4—4 of FIG. 3;

FIGS. 5 and 6 show steps in the construction of the motor assembly; and

FIG. 7 is a view similar to FIG. 1 but showing an alternative construction.

DETAILED DESCRIPTION OF THE DRAWINGS

With specific reference to FIGS. 1 and 2, an electric motor 10 comprises a sheet metal cylindrical outer shell 11, end plates 12 and 13 and a rotor shaft 14. Within the shell 11 are stator laminations and windings (not shown) which may have a conventional construction. The motor may comprise a shaded-pole motor. A plurality of air vents 15 are preferably formed in the stator shell 11 to permit cooling air to flow through the interior of the motor.

In the specific example being illustrated and described herein, the motor 10 is mounted within the opening of a housing 17, and a plurality of lugs or mounting arms connect the motor 10 to the housing 17. In the present example, three lugs 18, 19 and 20 are provided.

The lugs 18-20 are substantially identical and consequently only the lug 18 is described in detail herein. The lug 18 comprises an outer mounting pad 22, an inner mounting pad 23 and a flexible spring arm 24 that extends between the two pads 22 and 23. As shown in FIG. 1, the pad 22 is positioned against a surface of the housing 17 and it is secured thereto by bolt fasteners 26 that extend through holes 27 formed in the pad 22. The inner pad 23 is positioned against the outer surface of the shell 11 and is secured thereto in a manner to be described in detail hereinafter. The spring arm 24 has a flat section that extends generally parallel to the axis of the shaft 14 and transverse to a tangential line of the motor shell. As a result, when the motor assembly is mounted as shown in FIG. 1, the stator of the motor may move slightly in the circumferential direction and cause the spring arm portions 24 of the three lugs to flex circumferentially during operation of the motor.

As is best shown in FIGS. 3 to 6, the inner pad 23 of the lug 18 has a generally square configuration and, in the example illustrated in these figures, it is secured directly to the outer surface of the cylindrical shell 11. The pad 23 is secured to the shell by at least one, and preferably two, interlocking connections 31 of the general character shown in O. P. Hafner U.S. Pat. Nos. 3,726,000 and 3,981,064. This type of connection 31 is employed to secure two adjoining sheet metal plates together, which in this instance are the shell and each pad. Each connection 31 is formed by a machine, described in the above two patents, which presses the two plates together, cuts two spaced slits 32 in the plates 11 and 23 and deforms the portions between the slits outwardly to form an outer bridge 33 and an inner or interlocking bridge 34. The bridges 33 and 34 are displaced outwardly to the positions best shown in FIG. 4 where the lower surface of the inner bridge is substantially flush with the outer surface 35 of the pad 23. A compressive force is then applied across the bridges 33 and 34 in the vertical direction as seen in FIG. 4, and this force is sufficient to spread or deform the inner bridge 34 laterally outwardly and over the outer surface 35 of the pad 23. Thus, the inner bridge 34, which is part of the shell, overlies the pad 23 and forms an interlocking connection. As described in U.S. Pat. No. 3,981,064, the outer bridge 33 may be prevented from lateral deformation.

Further important features of the present invention reside in the provision of a prestress between the pad 23 and the shell 11 and of the orientation of the slits 32 and the resulting bridges 33 and 34.

The prestress is achieved by forming a camber 36 on each inner pad 23. As shown in FIG. 5, the pad 23 is cambered by bending it to form an arch that has a radius which is less than the radius of the outer surface of the shell 11. The camber or arch 36 is in the direction of the circumference of the shell, and the center part of the pad 23 is spaced or arced radially outwardly from the surface of the shell. As the mechanical connection is formed, a radial force is applied in the direction of the arrows in FIG. 5 which presses the pad 23 and the shell 11 together. The two mechanical connections 31 are then formed to secure the parts in this position, but a prestress remains which results in a force that attempts to return the pad to the initially unstressed, arched configuration. Compressive forces as indicated by the arrows in FIG. 6 thus remain.

The orientation of the slits 32 and the bridges 33 and 34 is substantially in the circumferential direction, as is best shown in FIGS. 1 and 2.

When the motor 10 constructed and mounted in the housing 17, as shown in FIG. 1, is placed in use, fluctuating loads in the circumferential direction are placed on the connections 31 between the shell and the lugs. The fluctuating loads or stresses are the result of the starting torque and, in some motor designs, reversing torque. They, of course, are in addition to the steady stresses due to dead weight and to rated load. The fluctuating loads cause the shell 11 to shift slightly in the circumferential direction relative to the housing 17, and the spring arms 24 of the lugs bend or flex slightly. These loads also bend the inner pads 23 of the lugs but, at normal loads, the prestress described above prevents the end portions 37 of lug 23 from being lifted off the surface of the shell 11. The prestress is thus effective to minimize the fluctuating stresses directly on the two connections 31.

The circumferential orientation of the bridges 33 and 34 also reduces the likelihood of failure. If the bridges were to extend longitudinally, the circumferential loads on the pads would tend to flex the pads along longitudinal lines which would be parallel to the slits 32. By placing the bridges and the slits, which produce weakened areas of the pad, out of a longitudinal orientation, the connections 31 are thereby strengthened.

FIG. 7 illustrates an alternative arrangement for fastening a plurality of lugs 41 to the shell 42 of an electric motor 43. Whereas the lugs 18-20 are secured directly to the motor shell 11, in the arrangement shown in FIG. 7, the lugs 41 are secured to an annular metal band 44 which is sometimes referred to as a belly band. The band 44 is split and a screw connection 46 is utilized to secure the ends thereof together and to tightly secure the band to the motor shell. The inner surface of the band 44, of course, fits tightly against the outer surface of the shell 42. The lugs 41 are secured to the band 44 by connections 47 which are identical with the connections illustrated and described in connection with FIGS. 1-6.

It will be apparent from the foregoing that a novel and useful construction has been provided. Since the lugs are fastened to the motor using mechanical interlocking connections, spring steel may be used for making the lugs without danger of destroying the temper because the lugs are not heated. Further, the connection is economical because the lugs are mechanically connected to the motor and do not require weld pads, hinges, etc. The orientation of the bridges and the prestress of each joint, in a connection that is subjected to fluctuating stresses, substantially increases the life and load capacity of the joint and make the joint less susceptible to fatigue failure.

As a specific example, when the motor is a ½ h.p. type and the lugs are made of Martensitic steel, the camber 36 is high enough to require a compressive force (along the arrows shown in FIG. 5) of approximately 150 pounds to flatten the lug against the shell.

While the general configuration of the mounting lugs was previously known, and while the specific form of the mechanical connection was previously known, the use of such a connection on a motor has not been known. Normally persons skilled in this art would not consider using a mechanical connection between two parts in circumstances where one of the two parts must fit tightly against still another part, because a mechanical connection normally requires a protrusion which would prevent such a tight fit. Such is not the case with the connection described herein.

Further, persons skilled in the art normally would not consider using a mechanical connection designed for flat parts, in a construction where at least one of the parts, such as a motor shell, is curved. Still further, persons skilled in the art would not consider using this connection where one of the parts is made of spring steel which has poor ductility.

While the examples shown in the drawings include two connections 31 between each lug and the shell, it would be possible to use only one connection or more than two. The provision of the prestress and the orientation of the bridges may also be utilized in other constructions where fluctuating loads may be encountered, and these features are not limited to use with electric motor mounts.

What is claimed is:

1. Apparatus comprising:
   (1) an electric motor having a central axis and including a generally cylindrical part made of sheet metal;
   (2) at least one sheet metal mounting lug for mounting said part on a housing said lug comprising a pad positioned on a surface of said part and an arm extending generally radially outwardly from said part and said pad and toward said housing; and
   (3) at least one mechanical interlocking connection securing said pad to said part, each connection comprising at least one perforation in said pad, and deformed portions of said pad and said part at said perforation making an interlocking connection between said pad and said part, said pad having a curvature substantially conforming to said cylindrical part and being held flat against said part by said connection, and said pad and said part being subject to loads directed circumferentially of said part during operation of the motor, said connection being subjected to a load in the circumferential direction during operation of the motor, and said pad having a prestress therein in said circumferential direction, said part having an axis concentric with the central axis of said motor, said perforation and said deformed portions being formed by parallel slits and a bridge between said slits, and said slits and said bridges extending substantially circumferentially of the axis of said part.

2. Apparatus according to claim 1, wherein said pad has an unstressed curve in the circumferential direction which exists before said pad is connected to said part, and a stressed curve in the circumferential direction which exists after said pad is connected to said part, said unstressed curve having a smaller radius than said stressed curve, whereby said pad is bent and has a prestress therein after said pad is connected to said part.

3. Apparatus according to claim 1, wherein said part is a motor shell.

4. Apparatus according to claim 1, wherein said part is a belly band.

* * * * *